United States Patent [19]

Schiesser

[11] 4,314,872
[45] Feb. 9, 1982

[54] APPARATUS FOR EQUIPPING PROFILES FORMED OF ELASTIC MASSES WITH VELOUR BANDS

[75] Inventor: Walter H. Schiesser, Zrich, Switzerland

[73] Assignee: Schiesser AG, Switzerland

[21] Appl. No.: 160,594

[22] Filed: Jun. 18, 1980

[30] Foreign Application Priority Data

Mar. 26, 1980 [CH] Switzerland ............... 2382/80

[51] Int. Cl.³ ............................. B29B 3/00
[52] U.S. Cl. ............................. 156/500; 49/440; 49/441; 156/244.25; 156/244.27; 264/171; 425/114
[58] Field of Search ............... 156/243, 244.11, 244.23, 156/244.24, 244.25, 244.27, 321, 322, 500; 425/113, 114, 324.1, 327, 328, 380; 264/167, 171, 177 R; 428/82, 83, 85, 88, 90, 95, 96; 49/440, 441

[56] References Cited

U.S. PATENT DOCUMENTS 3,067,455 12/1962 Reid ............................. 264/171
3,374,578 3/1968 Mesnel ........................... 49/440
3,401,075 9/1968 Jackson .......................... 428/90
3,458,386 7/1969 Shanok et al. ............... 156/244.27
3,624,964 12/1971 Bordner et al. ................. 49/441

Primary Examiner—Caleb Weston
Attorney, Agent, or Firm—Ostrolenk, Faber, Gerb & Soffen

[57] ABSTRACT

Profiles or sectional shapes formed of elastic masses, especially rubber, are equipped with velour bands or tapes. The application of the velour bands is accomplished in the already formed profile which is still in a heated state, by slightly pressing the band carrier into the mass. The apparatus utilizes a guide element operatively associated with an injection disk or nozzle of an extruder, in order to deposit the velour band into the material at the extruder outlet. The profiles thus formed are used as sealing profiles in the window guides in the automotive industry.

8 Claims, 6 Drawing Figures

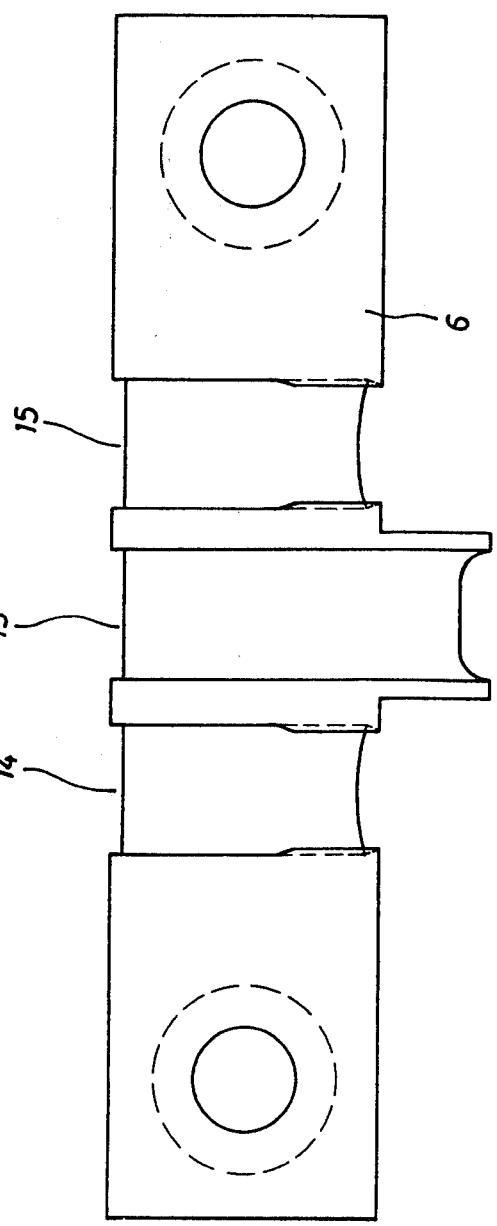

APPARATUS FOR EQUIPPING PROFILES FORMED OF ELASTIC MASSES WITH VELOUR BANDS

BACKGROUND OF THE INVENTION

The present invention relates to a new and improved method of, and apparatus for, equipping profiles or sectional shapes formed of elastic masses, such as typically for instance rubber, with a support or covering of velour bands in one working operation. In the context of this disclosure there is to be understood under the expression "velour bands" or equivalent terminology, all elongate carriers or supports of fibers or the like which are similar in form to velour bands.

Sealing profiles formed of plastic masses, such as for instance rubber, are predominantly employed in the automotive industry, and specifically are utilized as so-called channel profiles.

Such profiles or sectional shapes usually are present in the form of a substantially U-shaped member arranged within a metallic rail, and internally of the U-portion of such member a glass pane or window can travel up and down. On the one hand, such profile serves for sealing against undesirable entry of water and, on the other hand, it serves the purposes of protecting the glass and of excluding disturbing noises.

Between the rubber and the glass there must be provided a layer having good sliding properties, since if there is direct contact with the rubber, when in a dry state, there exists too great adhesion, and the window pane can only be moved with the application of a large force.

Approximately fifteen years ago these profiles were fabricated in a manner such that the actual rubber profile was extruded and thereafter there was manually adhesively bonded the velour bands or the like. However, with present day labor costs such fabrication technique has become much too costly.

Attempts have been made to find another solution and there was found a so-called flocking technique. During flocking the profile which previously has been separately extruded from rubber is coated or sprayed in a special throughpass chamber or compartment with an adhesive solution, after which it travels continuously through a tunnel where the small velour fibers are electro-statically emplaced in the form of individual threads of about 1.5 to 2.5 millimeters length and perpendicularly anchored in the adhesive solution. A heating operation then ensures the drying and vulcanization of the adhesive solution, which likewise is carried out in a continuous throughpass operation.

Although in the early stages this fabrication technique was not accepted by the automobile manufacturers, because the anchoring of the velour fibers or threads was not satisfactory, nonetheless after a number of years the automobile industry decided to adopt the flocked profiles or sectional shapes, particularly since with time there could be discovered better adhesive solutions.

The reason for this change to flocked profiles predominantly was the question of costs. Even today the automobile factories would still prefer to use the prior fabricated profiles or sectional shapes which were manually equipped with the velour bands, and specifically for the following reasons:

Due to the numerous up-and-down movements of the side windows of automobiles, the velour bands become worn with time, giving rise to direct contact between the glass of the window pane and the rubber. Consequently, after a certain amount of time the window panes become increasingly difficult to move, because of the direct contact of the window pane glass with the rubber and the resultant adhesion. In fact, it has been found that with time the window panes even become jammed and cannot be moved at all. When using the earlier fabricated profiles or sectional shapes which employed fabricated velour bands, composed of a woven substrate band having woven therein the velour fibers, even after the natural wearing away of the velvet-like velour bristles or fibers a direct contact with the rubber could nonetheless be avoided. Since the fabric band has an appreciably greater wear resistance than the free velour bristles or fibers, there was insured a much longer longevity of the profile and easy motion of the window panes.

SUMMARY OF THE INVENTION

Therefore, it is a primary object of the present invention to provide a new and improved method of, and apparatus for, equipping profiles or sectional shapes formed of rubber or other elastic masses again with the heretofore conventionally employed velour bands or the like, under economically feasible conditions, these velour bands comprising a woven carrier band and velour threads or fibers embedded therein.

Another important object of the present invention aims at the provision of a new and improved method of, and apparatus for, equipping profiles formed of elastic masses with velour bands in an extremely reliable, accurate and economical fashion.

Yet a further significant object of the present invention aims at the provision of a new and improved construction of apparatus for equipping profiles or sectional shapes formed of elastic masses with velour bands or the like, which apparatus is relatively simple in construction and design, economical to manufacture, extremely reliable in operation, and not readily subject to breakdown or malfunction, and which requires a minimum of maintenance and servicing.

Now in order to implement these and still further objects of the invention, which will become more readily apparent as the description proceeds, the method aspects of the present development are characterized by the features that, following the formation of the elastic profile, and specifically, during such time as the material of the profile is still in a heated condition, a velour band is applied by means of the underside of its carrier band to the profile and pressed against the profile. Thereafter, there is accomplished vulcanization of the profile which is covered with the velour band.

Preferably, with this method the operations are continuously performed, and the pressing of the band at or into the still plasticized mass of the profile is automatically accomplished by passing the composite through a constricted portion. Vulcanization is advantageously carried out through the use of heated air.

As already alluded to above, the invention is not only concerned with the aforementioned method aspects, but relates to a new and improved construction of apparatus for the performance thereof. Generally speaking, the inventive apparatus is manifested by the features of a guide element provided for at least one velour band or the like, this guide element being provided with openings corresponding to the profile or sectional shape to be fabricated. The guides for the bands with the profile openings combine or unite towards the outlet, and this combined throughpass is constricted in such a manner that the carrier band of the velour band is pressed into the outer layer of the profile or sectional shape while it is still in a heated condition.

According to a particularly advantageous construction the guide portion for the velour band or bands as well as the combined or united end section of the band and profile guide are constructed as a mountable or assembly component. This renders possible, with the slightest expenditure, post-fitting existing presses or extruders used for the fabrication of the previously described profiles or sectional shapes.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 schematically illustrates in an enlarged view an insert element used in the injection disk or nozzle of the arrangement of FIGS. 2 and 3;

FIG. 5 is an end view of the insert element of the showing of FIG. 4; and

DETAILED DESCRIPTION OF THE PREFERRED EMBODIMENTS

Figure 1:
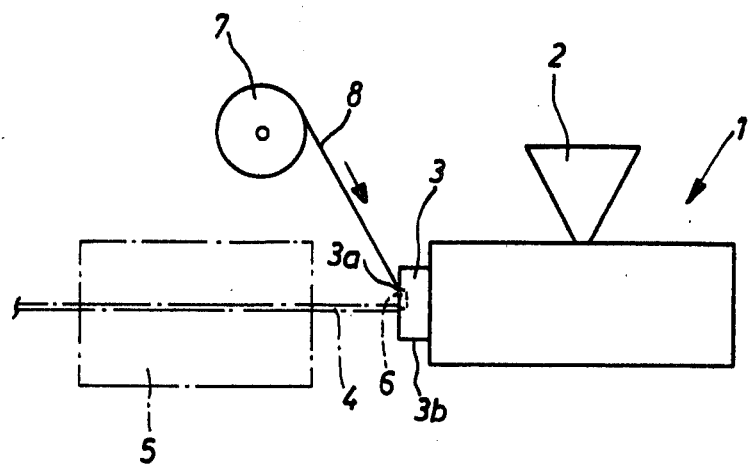
FIG. 1 is a total schematic view of an installation for fabricating profiles or sectional shapes and equipped with an auxiliary apparatus according to the invention.

Describing now the drawings, in FIG. 1 there is illustrated an exemplary embodiment of an installation for the fabrication of rubber profiles or sectional shapes, which are equipped at least in part with velour bands or tapes or the like. The press equipment 1, an extruder for instance, comprises a filling funnel 2 and the actual injection disk or nozzle 3. The extruded profile or sectional shape 4, following its exit out of the extruder 1, is conducted through a vulcanization device 5, and the profile or sectional shape 4 is previously, i.e. at the outlet or exit side 3a of the spray or injection head 3b, equipped with a velour band or tape 8 or equivalent structure, by means of an auxiliary device 6 which is mounted at the injection disk or nozzle 3. This velour band 8 is continuously wound-off of a supply roll 7.

FIGS. 2 to 5 show details of the construction of the injection disk of nozzle 3 (FIGS. 2 and 3) and the construction of the insert member or insert means 6 (FIGS. 4 and 5) which is to be inserted into such injection disk 3.

Figure 6:
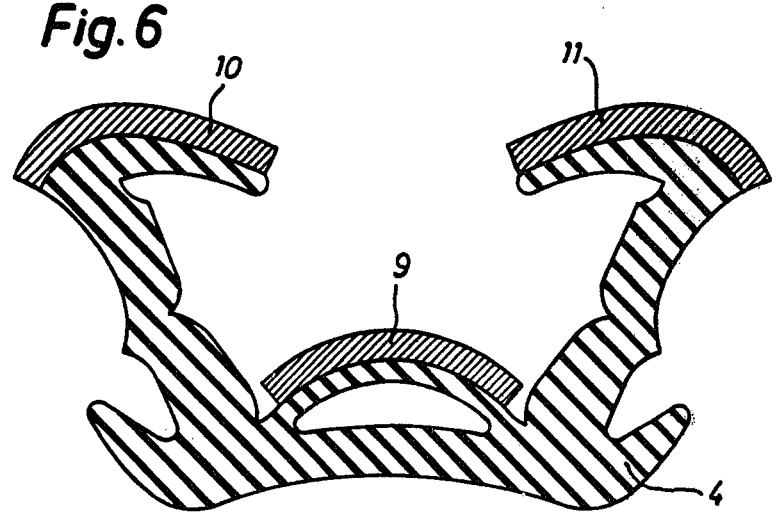
FIG. 6 is a sectional view through a rubber profile or sectional shape equipped with velour bands or tapes.
Figure 2:
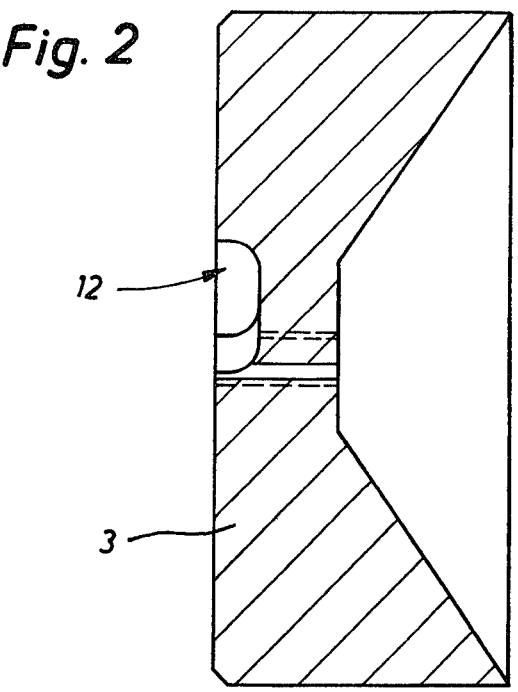
FIG. 2 is a sectional view of the injection disk or nozzle of the press or extruder structure shown in FIG. 1.
Figure 3:
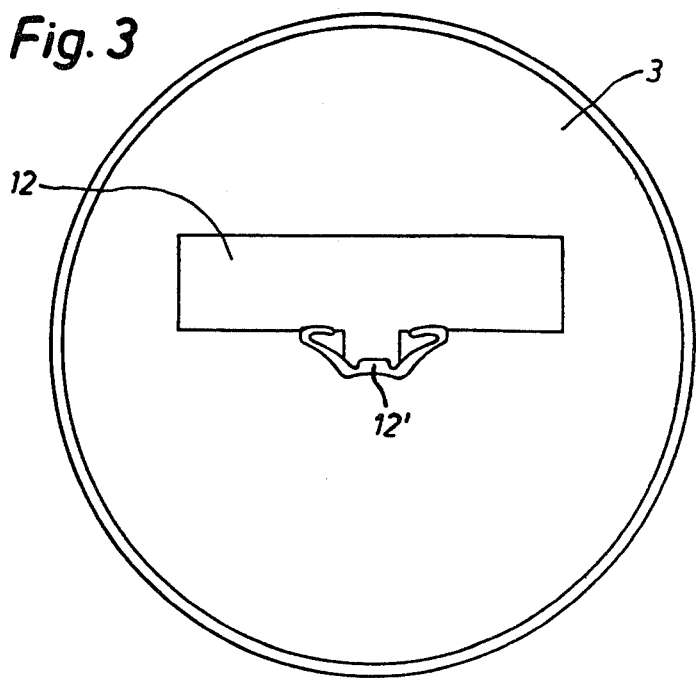
FIG. 3 is a front view of the injection disk or nozzle of the press or extruder structure shown in FIG. 1.

Finally, in FIG. 6 there is shown, on an enlarged scale, a sectional view through a rubber profile or sectional shape, as the same can be fabricated, for instance, with the equipment shown in FIGS. 2 to 5 and which is provided with three velour bands or tapes 9, 10 and 11.

As to the insert element or part 6, which is to be secured at the recess 12 of the injection disk 3, for instance by means of threaded bolts or equivalent structure, there will be seen from the showing of FIGS. 4 and 5 the three channels 13, 14, 15 for the throughpassage of the velour bands 9, 10 and 11, respectively.

The previously described method and the related apparatus and extrusion equipment (injection head/injection disk) fulfill the desires of the automobile manufacturer as to application of a rubber layer with velour bands, composed of a tightly woven fabric layer serving as a carrier band equipped with the velour bristles or fibers, while affording more favorable fabrication costs that with the heretofore described technique of the prior art where such bands were manually adhesively applied to the profiles or sectional shapes.

Hence, both the installation and the investments are appreciably more justifiable economically, and it is possible to fabricate the finished profiles or sectional shapes covered with the velour bands, while employing a throughpass process which works in a continuous manner and requires very few operating personnel. The continuous vulcanization advantageously is accomplished with heated air, and worm presses (extruders), which are already known in the art from the rubber industry, also can be employed.

A metallic disk, serving as the injection disk 3 (which functions as a die, extrusion disk or nozzle) is constructed with a hollow chamber or compartment 12' such that upon passage of the plastic rubber mass through the injection or extrusion disk 3, the desired profile shape is formed.

At the outlet side or outlet 3a, where the profile or sectional shape 4 leaves the injection disk 3, the latter has formed therein a recess 12 in which there can be placed and laterally threadably fixed the insert element 6 which serves as the guide means for the velour bands 8. This insert element 6 can be composed, for instance, of a number of parts or sections, something which is advantageous if a plurality of velour tapes which are to be attached are not uniformly disposed horizontally, but are located at different angles with respect to the center of the profile or sectional shape.

The insert element 6 is provided with the milled or machined portions forming the channels 13, 14 and 15 of a size enabling exact lateral guiding of the infed velour bands 9, 10 and 11. The recesses forming the band guide channels 13, 14, 15 can also have a different configuration, for instance can be concave, convex or disposed at a certain angle or along a curved line.

The velour bands 9, 10 and 11 are fed from the top into the machined guide channels 13, 14 and 15 and at the lower region thereof contact against the plastic mass of the formed profile or sectional shape 4, and specifically come into contact with the profile at the side of the fabric band. These tapes or bands are then again withdrawn at the lower region of the insert element 6, and by virtue of the material flow of the effluxing profile or sectional shape 4 there are entrained the velour bands 9, 10 and 11. As can be seen, therefore, the insert element 6 cooperates with the injection disk 3 to define a path along which the velour bands are fed into contact with the profile 4.

These velour bands 9, 10 and 11, due to the constricted configuration of the throughguide arrangement, are fixedly pressed and anchored in the surface of the plastic and still unvulcanized profile material mass, and the profile material mass penetrates into the voids or recesses of the fabric material of the bands and thus fixedly retains the bands snugly seated against the related profile or sectional shape 4, as best seen by referring to FIG. 6.

In order to obtain a good bond or connection between the fabric of the velour bands 9, 10 and 11 and the plastic mass of the profile or sectional shape 4, the fabric bands previously can be prepared in a conventional manner so that they have good adhesion and compatability with the rubber profile.

The insert element 6 for the infed velour bands 8 can be attached movably to the injection disk 3 (extrusion or extruder disk) such that the pressure of the fabric upon the plastic mass can be varied. Consequently, it is possible to vary the penetration of the plastic mass into the fabric band, which might be necessary under circumstances when working with correspondingly hard or completely soft and fluent or readily flowable mixture of the plastic mass.

After the exit from the injection disk 3 the now snugly interconnected parts, namely the profile or sectional shape formed of a plastic mass and the velour bands, pass through a vulcanization oven of conventional design, for instance working with heated air or microwaves or in another suitable manner. At the end of this continuous and generally known throughpass vulcanization device 5 the formed profile or sectional shape which is covered with the velour bands 9, 10 and 11 is in a condition where it can be cut to length or wound up.

Instead of using a fixed insert element 6 it is possible to employ, for instance, one or a number of rotating rolls, whose milled band guide channels or machined guide portions can be differently constructed, for instance flat, concave, convex or disposed at a certain angle or along a curved line.

While there are shown and described present preferred embodiments of the invention, it is to be distinctly understood that the invention is not limited thereto, but may be otherwise variously embodied and practiced within the scope of the following claims.

What is claimed is:

1. An apparatus for providing profiles formed of elastic masses with velour bands, said apparatus comprising:

a guide element for guiding a velour band;

means for forming a profile of a particular shape, said profile-forming means including means for heating the profile; said profile-forming means including an injection disc for forming and shaping the profile, and said guide element comprising an element mounted upon said injection disc;

said guide element cooperating with said profile-forming means to define a path for feeding a velour band to cause the velour band to come into contact with a formed profile passing through said profile-forming means after the profile has been heated by said profile-forming means and while the profile is still in a heated condition; said path including throughpass means for passage of the combination of the profile and the velour band; and said throughpass means including a portion which is constricted in such a manner as to press a carrier band of the velour band into an outer layer of the profile which is still in a heated condition.

2. The apparatus as defined in claim 1, wherein said guide element comprises fixed channel means for guiding the velour band.

3. The apparatus as defined in claim 11, wherein said guide element is so placed relative to said profileforming means as to feed the velour band into contact with the profile from a position above the profile.

4. The apparatus as defined in claim 1, wherein said injection disk has a recess formed therein, and wherein said element comprises an insert element received in said recess.

5. The apparatus as defined in claim 4, wherein said insert element comprises a portion cooperating with said injection disk to define fixed channel means for guiding the velour band.

6. The apparatus as defined in claim 4, wherein said insert element is adjustable relative to said injection disk, for adjusting said constricted portion of said throughpass.

7. The apparatus as defined in claim 1, wherein said guide element comprises a movable element for feeding the velour band into contact with the profile.

8. The apparatus as defined in claim 7, wherein said movable element comprises a roller.

* * * * *

UNITED STATES PATENT OFFICE
CERTIFICATE OF CORRECTION

PATENT NO. : 4,314,872
DATED : FEBRUARY 9, 1982
INVENTOR(S) : WALTER H. SCHIESSER

It is certified that error appears in the above-identified patent and that said Letters Patent are hereby corrected as shown below:

Claim 3, line 1, delete "11" and insert --1--.

Signed and Sealed this

Ninth Day of October 1984

[SEAL]

Attest:

Attesting Officer

GERALD J. MOSSINGHOFF

Commissioner of Patents and Trademarks